US005895681A

United States Patent [19]

Cirigliano et al.

[11] Patent Number: 5,895,681
[45] Date of Patent: Apr. 20, 1999

[54] METHOD OF PRESERVING TEA CONTAINING BEVERAGES

[75] Inventors: Michael Charles Cirigliano, Cresskill; Raymond Thomas McKenna, Scotch Plains; Paul John Rothenberg, West Milford, all of N.J.

[73] Assignee: Thomas J. Lipton, Division of Conopco, Inc., Englewood Cliffs, N.J.

[ * ] Notice: This patent is subject to a terminal disclaimer.

[21] Appl. No.: 08/763,423

[22] Filed: Dec. 11, 1996

Related U.S. Application Data

[XX .
[60] Provisional application No. 60/020,155, Jun. 20, 1996, and provisional application No. 60/020,156, Jun. 20, 1996.

[51] Int. Cl.$^6$ .............................. A23F 3/00; A23L 2/44
[52] U.S. Cl. .............. 426/330.3; 426/42; 426/335; 426/477; 426/597; 426/654
[58] Field of Search ..................... 426/597, 654, 426/477, 330.3, 335, 42

[56] References Cited

U.S. PATENT DOCUMENTS

| H1628 | 1/1997 | Ekanayake | 426/597 |
|---|---|---|---|
| 4,539,216 | 9/1985 | Tse | 426/597 |
| 4,600,706 | 7/1986 | Carter | 514/31 |
| 4,664,861 | 5/1987 | Pritikin, deceased et al. | 264/173 |
| 4,797,293 | 1/1989 | Evans et al. | 426/597 |
| 5,196,344 | 3/1993 | Ruttan | 436/18 |

OTHER PUBLICATIONS

Flak et al. 1988. Determination of wines and other beverages by high pressure liquid chromatography. Mitteilungen Klosterneuburg. 38(24)10–16.

Millies, K. et al. 1977. Natamycin. Fluess. Obst (Bad Homburg) (44)56–64.

Khoudokormoff, B. 1984. Are resistance development and morphological changes possible. Wein–Wissenschaft vol. 39, pp. 45–50.

Varnum et al. 1994. Beverages. Chapmann and Hall N.Y. p. 91.

J. Giese, "Antimicrobials: Assuring Food Safety", Food Technology, 48 (6) pp. 101–110, Jun. 1994.

Morris and Hart, "Pimaricin—What is it?", Culture Dairy Products Journal, vol. 13, p. 22, 1978.

T. Mattila, "Automated Turbidometry—A Method for Enumeration of Bacteria in Food Samples", Journal of Food Protection, 50, pp. 640–642, Aug. 1987.

*Primary Examiner*—Helen Pratt
*Attorney, Agent, or Firm*—James J. Farrell

[57] ABSTRACT

An aqueous based tea solids containing beverage is disclosed which also contains a sufficient amount of Natamycin in combination with reduced levels of selected chemical preservatives to prevent the outgrowth of yeast and/or mold, making the beverage significantly more organoleptically acceptable.

9 Claims, No Drawings

METHOD OF PRESERVING TEA CONTAINING BEVERAGES

CROSS-REFERENCE TO RELATED APPLICATION

This application claims the benefit of U.S. Provisional Application Nos. 60/020,155, filed Jun. 20, 1996 and 60/020,156, filed Jun. 20, 1996.

BACKGROUND OF THE INVENTION

1. Field of the Invention

The present invention relates to the use of a natural preservative such as Natamycin in combination with chemical preservatives such as sorbates, benzoates and the like in aqueous based beverages containing tea solids which under some conditions are subject to yeast and mold outgrowth.

2. Related Art

Natamycin, also known as pimaricin, is an antifungal agent produced by *Streptomyces natalensis*. The compound is effective against yeasts and molds and is reported to be ineffective against bacteria. It is approved for use as an additive which may be applied to the surface of cuts and slices of cheese to inhibit mold spoilage (21 CFR 172.155). This information is available from an article on "Antimicrobials: Assuring Food Safety" by J. Giese in the June 1994 Food Technology periodical 48 (6) pp. 101–110.

Natamycin has been used in animal feeds U.S. Pat. No. 4,600,706, in sausages and sausage casings U.S. Pat. No. 4,664,861 and in mixtures with other preservatives to preserve milk U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeasts and molds, as opposed to bacteria (see Morris and Hart, "Pimaricin—What is It?", *Culture Dairy Products Journal*, Volume 13, page 22, 1978.) Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and molds may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an antiyeast activity when added to wines, and various fruit juices, such as apple juice or orange juice. (See, Morris and Hart, cited above.)

BRIEF DESCRIPTION OF THE INVENTION

Many preservatives are readily available for many diverse uses. Tea containing beverages, however, because of their delicate balance of flavors require the utmost care in selecting preservatives. In addition, tea containing beverages are difficult systems to stabilize particularly against eucaryotic organisms such as mold and yeast which have a competitive advantage in many of these beverages. A fine balance must thus be achieved in stabilizing teas without deleteriously affecting their flavor.

A method for preserving tea beverages including herbal teas, both "still" and carbonated, for distribution and sale at ambient or chilled temperatures is disclosed. The method uses Natamycin (pimaricin) to prevent microbial spoilage in combination with chemical preservatives. Acidified and native pH ready-to-drink (RTD) tea beverages, in the 2.5–6.5 pH range are known to be susceptible to spoilage by yeast and mold. As compared to cans, tea beverages packaged in glass and plastic bottles (because of increased $O_2$ ingress), as well as those at the higher range of the pH spectrum, are more sensitive to yeast and mold spoilage. Natamycin, when introduced into various tea beverages, in its commercial form (as "Delvocid"—a 50/50 blend with lactose), together with chemical preservatives such as e.g. potassium sorbate at concentrations ranging from 5–125 ppm Natamycin and about 50–500 ppm chemical preservative as the salt, completely inhibited the outgrowth of yeast and significantly delayed, or completely inhibited (depending on concentration and other factors), mold spoilage. As the pH increases above about 4.0 levels of chemical preservative higher than 500 ppm may be necessary. Possibly as high as 1000 ppm or more.

The stability and ostensibly the efficacy of the Natamycin, reported to be sensitive to oxidation, in combination with selected chemical preservatives appears to be enhanced, as evidenced by the stability achieved in PET and glass bottles, by the presence of at least about 0.01% to 0.5% tea solids which contain naturally occurring antioxidants which have a significant antioxidant effect. Higher percentages of tea solids are also appropriate. Several of the preferred embodiments of tea containing beverages also include ascorbic acid, a known oxygen scavenger, which also contributes to this effect.

Heavy and divalent metals are also reported to adversely affect the stability of Natamycin. One preferred embodiment incorporates citric acid a natural sequestrate. This is further enhanced by the incorporation of other sequestering agents and/or by water hardness control which removes heavy metals as well as divalent metals. This negates the effect and sustains the efficacy of the Natamycin in the system. Other sequestering agents such as EDTA and its organic and inorganic salts e.g. sodium and the like, metaphosphoric acid salts, polyphosphoric acid salts, tartaric acid salts and phosphoric acid may also be used to sustain system efficacy over time, where water hardness control is not absolute.

Further, the simple expedient of incorporating a concentration of Natamycin, preferably 1.5 times or even more in excess of its maximum solubility, also significantly enhanced its effect, ostensibly by providing a "preservative" reserve buffer.

Natamycin, a fermentation by-product that is a naturally derived antimicrobial thus affords an opportunity to stabilize certain tea containing beverage formulations naturally without the use of chemical preservatives.

Natamycin is a creamy white, odorless, tasteless, practically insoluble crystalline amphoteric powder. It belongs to the polyene macrolide or macrycyclic lactone group of compounds. In low concentrations, Natamycin is a potent inhibitor of fungal microorganisms.

Natamycin is relatively stable when in a dry state or when mixed with dry diluents. However, the molecule is sensitive to ultraviolet light, oxygen, or extreme pH values. It is relatively insoluble in water in which its solubility is of the order 0.005–0.010 weight/weight percent. Additionally, even in solution, Natamycin is rather unstable. Aqueous solutions of 16 mcg/ml of Natamycin became microbiologically inactive after 24 hour exposure to light. Inactivation of Natamycin by light, peroxides or oxygen proceeds at the fastest rate in solution or suspension. Natamycin is also sensitive to heavy metals, and it may lose up to 75% of its effectivity in 4–5 hours in their presence.

Natamycin is also referred to by other names, e.g. Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g. from Gist-Brocades Food Ingredients, Inc. of King of Prussia, Pa. under the trademark DELVOCID®. Further details of the antibiotic can be found in The Merck Index, Tenth Edition, 1983, published by Merck & Co., Inc., entry no. 6278, page 922.

The chemical preservatives which may be employed are preferably sorbic acid and benzoic acid such as the sodium or potassium salts. Parabenzoic acid esters are also very effective. The preservative is effective in its acidic form and thus any method or compound by which it can be incorporated into a beverage may be used. Thus, the various salts and other compounds of preservatives may be usefully employed. The amount of preservative is about 5 to 500 ppm and preferably about 5 to 250 ppm for organoleptic effects.

The addition of about 50 ppm of Natamycin and 100 to 400 ppm chemical preservative to tea containing beverages has been found to reduce or completely eliminate yeast outgrowth in the tea beverage in the time frame required for commercial sale, i.e. for about 16 weeks.

The advantage of using Natamycin is that it allows the reduction of chemical preservatives thereby making a microbiologically stable beverage which is also significantly more organoleptically acceptable than those containing higher levels of chemical preservatives.

As used herein, the term "tea concentrate" refers to a product derived from concentrated tea extract which is diluted with water to form a drinkable tea beverage. The method of extraction is not significant and any methods known in the art may be used.

As used herein, the term "tea beverage" refers to a drinkable beverage prepared from tea concentrates, extracts or powder usually by dilution with water. Various other flavoring agents and/or juices may also be included such as fruit juices, vegetable juices and the like. The tea beverage concentrate is generally diluted with sufficient water to provide the tea beverage. Preferred tea concentrates or powders are typically diluted to a minimum of about 0.08% tea solids to provide the drinkable tea beverage but this depends on the flavor profile sought and amounts of 0.01 to 0.5% or higher may be used.

As used herein, the term "tea solids" refers to those solids normally present in a tea extract including normal tea antioxidants. Polyphenolic compounds are normally the primary component of tea solids. However, tea solids can also include caffeine, proteins, amino acids, minerals and carbohydrates.

All parts and proportions herein and in the appended claims are by weight unless otherwise indicated.

EXAMPLE 1

Summary

The Bioscreen test as described in an article entitled "Automated Turbidometry —A Method for Enumeration of Bacteria in Food Samples" by T. Mattila in Journal of Food Protection, 50, pp. 640–642 (August, 1987) was found to be an effective applied research tool in studying the dynamics of microbial growth and inhibition. It also is currently being used as a test screening vehicle to help identify preservative system alternatives for teas. In this study, Natamycin was screened to help identify a substitute for EDTA, in the yeast stabilization of cold-filled Ready-to-Drink tea.

In phase I of this study a bacteriocin (Natamycin), was compared to EDTA, for $Z.$ $bailii$ yeast inhibition, in a sorbate/benzoate preserved tea model system medium. This medium contained components found in a tea beverage but excluding any actual tea. The medium contained the following components:

| | |
|---|---|
| Difco Yeast Nitrogen Base | 0.6% |
| Sugars | 8.0% |
| Citric Acid | .1% |
| K benzoate | .03% |
| K sorbate | .04% |
| Sodium Hexometaphosphate | .05% |
| Water | balance |

85% phosphoric acid was used as an acidulant to pH 2.8

Natamycin at all concentrations tested, was found to be as effective as the EDTA control in inhibiting yeast outgrowth.

All screening study variables were incorporated into the tea beverage system medium, formulated with field water at a total water hardness level of 125 ppm as calcium carbonate. The organism challenge pool included selected tea spoilage strains of $Z.$ $bailii$, at an inoculation level of approximately 1,000 cells/ml.

Results

1. In the standard 6–7 day Bioscreen test time frame, the performance of all 3 Natamycin (100, 200, and 300 ppm) concentration levels was equal to that of the EDTA control, i.e. totally inhibiting $Z.$ $bailii$ outgrowth during the time period covered.

2. The positive control (without EDTA or Natamycin) showed Bioscreen outgrowth beginning on, approximately, day 3 of the study with a maximum response on day 6. Relative to in-bottle challenge studies this equates to actual spoilage in about 3–4 weeks.

Further Testing

A series of tests using Natamycin at varying levels, in water of varying hardness and also at varying inoculation levels of yeast were run. The tests were run on selected beverages representative of commercial ready-to-drink tea beverages.

Several different tea beverages were prepared for testing with the preservative of the invention as follows:

Beverage A.

| | |
|---|---|
| Tea powder | .08% |
| Color Component | .06% |
| Citric Acid | .07% |
| Lemon Flavor | .1% |
| HFCS (High Fructose Corn Syrup) | 12% |
| Natamycin (Delvocid 50% Natamycin) | .01% (50 ppm Natamycin) |
| Water balance to | 100% | pH was adjusted to 2.8 with 85% phosphoric acid.

Beverage B.

| K Sorbate | .02% |
|---|---|
| Tea | .08% |
| Color Component | .06% |
| Citric Acid | .07% |
| Lemon Flavor | .1% |
| HFCS | 12% |
| Natamycin (Delvocid 50% Natamycin) | .01% (50 ppm Natamycin) |
| Water balance to | 100% | pH was adjusted to 2.8 with 85% phosphoric acid.
Beverage C.

| K Sorbate | .01% |
|---|---|
| Tea | .08% |
| Color Component | .06% |
| Citric Acid | .07% |
| Lemon Flavor | .1% |
| HFCS | 12% |
| Natamycin (Delvocid 50% Natamycin) | .01% (50 ppm Natamycin) |
| Water balance to | 100% | pH was adjusted to 2.8 with 85% phosphoric acid.
Beverage D.

| K Sorbate | .02% |
|---|---|
| Tea | .08% |
| Color Component | .06% |
| Citric Acid | .07% |
| Lemon Flavor | .1% |
| HFCS | 12% |
| Water balance to | 100% | pH was adjusted to 2.8 with 85% phosphoric acid.
Beverage E.

| K Sorbate | .01% |
|---|---|
| Tea | .08% |
| Color Component | .06% |
| Citric Acid | .07% |
| Lemon Flavor | .1% |
| HFCS | 12% |
| Water balance to | 100% | pH was adjusted to 2.8 with 85% phosphoric acid.
Beverage F.

| K Sorbate | .03% |
|---|---|
| Ascorbic Acid | .01% |
| Tea Powder | .1% |
| Color Component | .02% |
| Tea Aroma | .1% |
| Tea Flavor | .08% |
| Natamycin (Delvocid 50% Natamycin) | .01% (50 ppm Natamycin) |
| Water balance to | 100% | pH adjusted to 4.0 with 85% phosphoric acid.
Beverage G.

| K Sorbate | .04% |
|---|---|
| Ascorbic Acid | .01% |
| Tea Powder | .1% |
| Natamycin (Delvocid 50% Natamycin) | .01% (50 ppm Natamycin) |
| Color Component | .02% |
| Tea Aroma | .1% |
| Tea Flavor | .08% |
| HFCS (High Fructose Corn Syrup) | 8% |
| Water balance to | 100% | pH adjusted to 4.0 with 85% phosphoric acid.

EXAMPLE 2

This study was designed to test the efficacy of 50 ppm of Natamycin against yeast spoilage in the presence of two "low" levels of potassium sorbate. Accordingly, two different potassium sorbate "controls" were included to demonstrate spoilage in the absence of Natamycin. All yeast-inoculated controls spoiled within one week. In contrast, the Natamycin/Potassium Sorbate variables remained stable against yeast.

The two sets of summary tables 1 and 2 are from a single microbial challenge study done in a ready-to-drink tea beverage. The water hardness was 103 ppm as (Ca(CO$_3$) and the pH 2.8. The first data set (Table 1) represents the results of the yeast inoculation. The second data set (Table 2) represents the same physical collection of samples, but reflects only the spoilage due to naturally occurring mold contamination.

Naturally occurring mold contamination afforded an opportunity to observe the effect of the Natamycin/Potassium Sorbate combination on mold spoilage. Note that mold spoilage was not observed in any of the potassium-sorbate-only samples because all bottles were removed after one week due to yeast spoilage.

SUMMARY OF TIME TO YEAST SPOILAGE
EXPRESSED AS # OF BOTTLES SPOILED PER WEEK

TABLE 1

| WEEK | BEVERAGE A | | | BEVERAGE B | | | BEVERAGE C | | |
|---|---|---|---|---|---|---|---|---|---|
| | NAT50 PPM HIGH | NAT50 PPM MED | NAT50 PPM LOW | NAT50 KS200 HIGH | NAT50 KS200 MED | NAT50 KS200 LOW | NAT50 KS100 HIGH | NAT50 KS100 MED | NAT50 KS100 LOW |
| Initial | 0 | 0 | 0 | 0 | 0 | 0 | 0 | 0 | 0 |
| Week 1 | 0 | 0 | 0 | 0 | 0 | 0 | 0 | 0 | 0 |
| Week 9 | 0 | 0 | 0 | 0 | 0 | 0 | 0 | 0 | 0 |
| Week 13 | 0 | 0 | 0 | 0 | 0 | 0 | 0 | 0 | 0 |
| Week 14 | 0 | 0 | 0 | 0 | 0 | 0 | 0 | 0 | 0 |
| Week 16 | 0 | 0 | 0 | 0 | 0 | 0 | 0 | 0 | 0 |
| Total | 38 | 38 | 38 | 38 | 37 | 37 | 39 | 36 | 38 |

TABLE 1-continued

Number of Units Tested

| WEEK | BEVERAGE D | | | BEVERAGE E | | |
|---|---|---|---|---|---|---|
| | KS 200PPM HIGH | KS 200PPM MED | KS 200PPM LOW | KS 100PPM HIGH | KS 100PPM MED | KS 100PPM LOW |
| Initial | 0 | 0 | 0 | 0 | 0 | 0 |
| Week 1 | 37 | 38 | 37 | 37 | 37 | 37 |
| Total Number of Units Tested | 37 | 38 | 37 | 37 | 37 | 37 |

KS = Potassium Sorbate
High = 100 yeast cells/ml inoculation
Med = 10 yeast cells/ml inoculation

SUMMARY OF TIME TO MOLD SPOILAGE EXPRESSED AS # OF BOTTLES SPOILED PER WEEK

TABLE 2

| WEEK | BEVERAGE A NAT50 PPM | BEVERAGE B NAT50 KS232 | BEVERAGE C NAT50 KS116 |
|---|---|---|---|
| Initial | 0 | 0 | 0 |
| Week 1 | 0 | 0 | 0 |
| Week 9 | 62 | 0 | 0 |
| Week 13 | 19 | 0 | 34 |
| Week 14 | 0 | 0 | 0 |
| Week 16 | 0 | 2 | 0 |
| Total Number of Units Spoiled/Units Tested | 81/114 | 2/112 | 34/113 |

KS = Potassium Sorbate
High = 100 yeast cells/ml inoculation
Med = 10 yeast cells/ml inoculation
Low = 1 yeast cell/ml inoculation
NAT = Natamycin

EXAMPLE 3

A test was run similarly to Example 2 but with different beverage formulations. This first formulation, Beverage F (Table 3), which is a plain unsweetened Ready-to-Drink tea at a pH of 4.0 and formulated with water at a hardness of 103 ppm as $Ca(CO_3)$, was tested using 50 ppm Natamycin and 200 ppm Sorbic acid.

SUMMARY OF TIME TO YEAST SPOILAGE EXPRESSED AS # OF BOTTLES SPOILED

TABLE 3

| WEEK | PRESERVATIVES | | |
|---|---|---|---|
| | NAT50, Sorbic 200, High | NAT50, Sorbic 200, Med | NAT50, Sorbic 200, Low |
| Initial | 0 | 0 | 0 |
| Week 5 | 0 | 0 | 0 |
| Week 9 | 0 | 0 | 0 |
| Week 13 | 0 | 0 | 0 |
| Week 14 | 0 | 0 | 0 |
| Week 15 | 0 | 0 | 0 |
| Week 16 | 0 | 0 | 0 |
| Total Number | 38 | 37 | 38 |

TABLE 3-continued

| WEEK | PRESERVATIVES | | |
|---|---|---|---|
| | NAT50, Sorbic 200, High | NAT50, Sorbic 200, Med | NAT50, Sorbic 200, Low |
| of Units Tested | | | |

High = 100 yeast cells/ml inoculation
Med = 10 yeast cells/ml inoculation
Low = 1 yeast cell/ml inoculation
NAT = Natamycin
Sorbic = Sorbic Acid The second formulation, Beverage G (Table 4), which is a plain sweetened ready-to-drink tea at a pH of 4.0 formulated with water at a hardness of 103 ppm as $Ca(CO_3)$, contained 50 ppm Natamycin and 300 ppm Sorbic acid.

SUMMARY OF TIME TO YEAST SPOILAGE EXPRESSED AS # OF BOTTLES SPOILED

TABLE 4

| WEEK | PRESERVATIVES | | |
|---|---|---|---|
| | NAT50, Sorbic 300, High | NAT50, Sorbic 300, Med | NAT50, Sorbic 300, Low |
| Initial | 0 | 0 | 0 |
| Week 5 | 0 | 0 | 0 |
| Week 9 | 0 | 0 | 0 |
| Week 13 | 0 | 0 | 0 |
| Week 14 | 0 | 0 | 0 |
| Week 15 | 0 | 0 | 0 |
| Week 16 | 0 | 0 | 0 |
| Total Number of Units Tested | 37 | 37 | 37 |

High = 100 yeast cells/ml inoculation
Med = 10 yeast cells/ml inoculation
Low = 1 yeast cell/ml inoculation
NAT = Natamycin
Sorbic = Sorbic Acid The results show stability at pH 4.0, which is relatively high, with reduced levels of sorbate and low levels of Natamycin.

Although the invention has been described in detail with respect to preferred embodiments thereof, variations and modification will be readily apparent to those skilled in the art without departing from the spirit and scope of the inventions as set forth in the claims.

What is claimed is:

1. A method of improving the stability of aqueous based tea beverages containing about 0.01% to 0.5% tea solids to prevent yeast and/or mold growth in the beverage for a period of at least about 6 to 16 weeks which comprises blending about 5 to about 125 ppm of Natamycin and about 5 to 500 ppm of a preservative selected from the group consisting of sorbic acid, benzoic acid, parabens and mixtures thereof into the beverage.

2. A liquid foodstuff including an aqueous tea infusion having 0.01 to 0.5% tea solids having 5 to 500 ppm of a preservative selected from the group consisting of sorbic acid, benzoic acid, parabens and mixtures thereof, a pH of 2.5 to 6.5 and at least about 5–125 ppm of Natamycin.

3. A foodstuff as defined in claim 2 further comprising sufficient tea solids to result in a significant antioxidant effect in an amount of at least about 0.01% to 0.5% or higher tea solids.

4. A foodstuff as defined in claim 2 further comprising an antioxidant or an oxygen scavenger in addition to tea solids.

5. A foodstuff as defined in claim 2 wherein said Natamycin is present in an amount of at least about 1.5 times the maximum solubility of said Natamycin in the beverage.

6. A foodstuff as defined in claim 2 wherein a metal sequestrant is present in an amount sufficient to reduce the effect on the Natamycin of solubilized metals.

7. A beverage as defined in claim 2 further comprising a flavoring agent or juice in addition to tea.

8. A foodstuff as defined in claim 2 which is carbonated.

9. A foodstuff as defined in claim 2 wherein the water used to prepare the beverage is treated to reduce the water hardness to a level of at least about 125 ppm or less measured as calcium carbonate.

* * * * *